United States Patent
Little et al.

(10) Patent No.: US 10,612,663 B2
(45) Date of Patent: Apr. 7, 2020

(54) GASKET FOR A CAMERA LENS, AND MULTI-HEADED CAMERA

(71) Applicant: Avigilon Corporation, Vancouver (CA)

(72) Inventors: Eric Little, Vancouver (CA); Nigel Geoffrey Taylor, Maple Ridge (CA); Yang Yang Wang, Coquitlam (CA); Andrew Luk Po Wu, Richmond (CA)

(73) Assignee: Avigilon Corporation, Vancouver (CA)

( * ) Notice: Subject to any disclaimer, the term of this patent is extended or adjusted under 35 U.S.C. 154(b) by 17 days.

(21) Appl. No.: 16/000,753

(22) Filed: Jun. 5, 2018

(65) Prior Publication Data

US 2019/0368613 A1    Dec. 5, 2019

(51) Int. Cl.
*F16J 15/3224* (2016.01)
*G08B 13/196* (2006.01)

(52) U.S. Cl.
CPC .... *F16J 15/3224* (2013.01); *G08B 13/19619* (2013.01)

(58) Field of Classification Search
CPC ...... F16J 15/3224; F16J 15/32; F16J 15/3228; F16J 15/0818; G08B 13/19619
See application file for complete search history.

(56) References Cited

U.S. PATENT DOCUMENTS

| | | | |
|---|---|---|---|
| 4,909,617 A * | 3/1990 | Boyd | G03B 11/041 359/511 |
| 7,322,755 B2 | 1/2008 | Neumann et al. | |
| 9,025,948 B2 * | 5/2015 | Tages | G03B 17/02 206/316.2 |
| 9,438,782 B2 | 9/2016 | Donaldson | |
| 9,715,165 B2 * | 7/2017 | Axelsson | G03B 17/02 |
| 10,148,799 B2 * | 12/2018 | O'Neill | H04B 1/3888 |
| 2004/0032668 A1 | 2/2004 | Schaefer et al. | |
| 2009/0122138 A1 | 5/2009 | Bischoff et al. | |
| 2012/0321294 A1 * | 12/2012 | Tages | G03B 17/02 396/535 |

(Continued)

OTHER PUBLICATIONS

Datasheet Axis P3707-PE Network Camera.
(Continued)

*Primary Examiner* — Clayton E. LaBalle
*Assistant Examiner* — Linda B Smith
(74) *Attorney, Agent, or Firm* — Daniel Hammond (57) ABSTRACT

There is described a multi-headed camera comprising a camera base, multiple camera heads coupled to the camera base, each camera head comprising a camera lens defining an observation angle, each camera head being configured to pivot such that the observation angle may vary between a minimum observation angle and a maximum observation angle, and a protective shield attached to the camera base, extending over the camera heads and shaped such that for each camera head a distance between the shield and the camera head varies as a function of the observation angle. Attached to each camera head is a resiliently deformable and flared gasket positioned around the camera lens and extending toward the shield. The gasket is configured such that, for any observation angle between the minimum and maximum observation angles, the gasket contacts the shield about a closed light seal path for preventing light from passing between the shield and the gasket, and reaching the camera lens.

26 Claims, 12 Drawing Sheets

(56) References Cited

U.S. PATENT DOCUMENTS

2015/0054104 A1     2/2015   Black
2015/0177596 A1     6/2015   Bergsten et al.
2016/0191813 A1     6/2016   Wu et al.

OTHER PUBLICATIONS

AXIS T94M02D Pendant Kit, Installation Guide, Feb. 2016.
Cisco Meraki, "Troubleshooting IR Reflection", https://documentation.meraki.com/MV/Video_Quality_and_Retention/Troubleshooting_IR_Reflection, retrieval date Apr. 19, 2018.

* cited by examiner

GASKET FOR A CAMERA LENS, AND MULTI-HEADED CAMERA

FIELD OF THE DISCLOSURE

The present disclosure relates to a gasket for a camera lens, and to a multi-headed camera comprising such a gasket.

BACKGROUND TO THE DISCLOSURE

Security cameras are often positioned behind protective, transparent covers or shields to prevent tampering and other undesirable interaction with the camera. With such cameras, it is important to reduce the negative effects of incoming radiation interfering with the shield. For example, light incident on the protective shield may undergo total internal reflection within the shield, the shield effectively acting as a wave guide to cause the incident light to be transmitted along the shield and onto the camera lens.

Certain foam gaskets are sometimes appropriate and useful in shielding camera lenses from unwanted light interference. For example, foam gaskets may be useful for a single-headed camera (that is, a camera having a single camera lens), in which the protective shield is typically hemispherical in shape. However, such gaskets are less effective if the protective shield is, for example, irregularly shaped, as may be the case with a multi-headed camera comprising multiple camera lenses.

In this context, the present disclosure seeks to provide an improved gasket for a camera lens, especially for use with a multi-headed camera.

SUMMARY OF THE DISCLOSURE

In a first aspect of the disclosure, there is provided a gasket for a camera lens. The gasket comprises a gasket base for positioning around a camera lens; and a resiliently deformable and flared sealing portion extending from the gasket base and for sealing against a protective shield for a camera lens. A thickness of the gasket decreases in a direction from the gasket base to the sealing portion. When in use with a protective shield for a camera lens, the sealing portion may be configured to contact the shield about a closed light seal path for preventing light from passing between the shield and the gasket, and reaching the camera lens.

A ratio of the thickness of the gasket at the gasket base to the thickness of the gasket at the sealing portion may be about 3:1.

The gasket may comprise an elastomer. The elastomer may comprise silicone.

The sealing portion may be treated with a substance for reducing a surface roughness of the sealing portion. In other words, the sealing portion may be treated with a substance for reducing a coefficient of friction between the sealing portion and the shield against which the sealing portion is to seal, relative to a coefficient of friction between the sealing portion before treatment and the same shield. Thus, decreasing the surface roughness of the sealing portion correspondingly increases the "smoothness" of the surface of the sealing portion, and decreases the coefficient of friction between the sealing portion and the shield ("coefficient of friction" normally being defined as a function of two surfaces in contact with one another). The substance may comprise a two-component coating such as the SL-030-5 series manufactured by Betterly LLC.

The gasket may comprise a shape of a truncated cone with concave sides.

A bonding agent may be applied to the gasket base for attaching the gasket to a camera lens cover.

The gasket base and the sealing portion may be integrally formed.

In a further aspect of the disclosure, there is provided a camera head comprising: a camera lens; a camera lens cover rigidly coupled to the camera lens; and a gasket. The gasket comprises a gasket base attached to the camera lens cover and positioned around the camera lens; and a resiliently deformable and flared sealing portion extending from the gasket base and for sealing against a protective shield for a camera lens. A thickness of the gasket decreases in a direction from the gasket base to the sealing portion.

In a further aspect of the disclosure, there is provided a multi-headed camera comprising: a camera base; multiple camera heads coupled to the camera base, each camera head comprising a camera lens defining an observation angle, and each camera head being configured to pivot such that the observation angle may vary between a minimum observation angle and a maximum observation angle; and a protective shield attached to the camera base, extending over the camera heads, and shaped such that for each camera head a distance between the shield and the camera head varies as a function of the observation angle. Attached to one or more of the camera heads is a resiliently deformable and flared gasket positioned around the camera lens and extending toward the shield. The gasket is configured such that, for any observation angle between the minimum and maximum observation angles, the gasket contacts the shield about a closed light seal path for at least substantially preventing light from passing between the shield and the gasket, and reaching the camera lens.

The distance between the shield and the camera head may be determined according to a straight line extending from the shield to the camera head. In some embodiments, the straight line does not comprise an optical path extending from the shield to the camera lens.

The minimum and maximum observation angles may comprise elevation angles of the camera lens relative to the camera base.

A friction force between at least one of the gaskets and the shield may be less than a force required for the at least one of the gaskets to fold over itself, for any observation angle between the minimum and maximum observation angles. A friction force between at least one of the gaskets and the shield may be less than a force required for the at least one of the gaskets to fold over itself as the camera head is moved such that the distance between the shield and the camera head is decreased.

The shield may be partially transparent to visible light so as to prevent an observer from viewing the camera heads.

The camera may further comprise an electronics housing extending from the camera base, and a shock absorber attached to the electronics housing and engaged with the shield. The shock absorber may comprises a resiliently deformable member configured to seal against the shield. The resiliently deformable member may be ring-shaped. The resiliently deformable member may comprise a flared sealing rib configured to seal against the shield. A portion of the shield engaged with the shock absorber may extend away from the camera base.

At least one of the gaskets may be configured such that the at least one of the gaskets is prevented from folding over itself as the camera head is moved such that the distance between the shield and the camera head is decreased. For example, at least one of the gaskets may be configured such that the at least one of the gaskets moves outwardly along an inner surface of the shield as the camera head is moved such that the distance between the shield and the camera head is decreased.

At least a portion of the shield may be crowned so as to reduce total internal reflection of light within the shield. The shield may comprise an outer surface and an inner surface facing the camera base, and at least a portion of the inner surface may be crowned so as to reduce total internal reflection of light within the shield. A crowned portion of the shield may extend beyond a seal defined by the engagement of the shock absorber with the shield.

BRIEF DESCRIPTION OF THE DRAWINGS

Specific embodiments of the disclosure will now be described in conjunction with the accompanying drawings of which.

DETAILED DESCRIPTION OF SPECIFIC EMBODIMENTS

The present disclosure seeks to provide an improved gasket for a camera lens, and to a multi-headed camera comprising such a gasket. While various embodiments of the disclosure are described below, the disclosure is not limited to these embodiments, and variations of these embodiments may well fall within the scope of the disclosure which is to be limited only by the appended claims.

As used herein, a reference to "about" or "approximately" a number or to being "substantially" equal to a number means being within +/−10% of that number.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

FIGS. 1-4 show various views of a multi-headed camera 10 in accordance with an embodiment of the disclosure. Camera 10 comprises a circular camera base 12 to which is attached a transparent, protective shield 14. Coupled to base 12 is a horizontal platform 24 seen in FIG. 3. Platform 24 and shield 14 collectively define an internal camera volume within which multiple camera heads 20 are provided, each camera head 20 comprising a camera lens cover 21 rigidly coupled to a camera lens 57. Camera lens 57 may in some embodiments comprise an assembly of camera lenses (e.g. multiple individual lenses, as known in the art). In the present embodiment, camera 10 includes four separate camera heads 20, although FIGS. 1 and 3 only shows two such camera heads 20, for clarity purposes. It will be understood that the present disclosure extends to multi-headed cameras with any number of camera heads, or indeed a camera housing a single camera head. Further contained within internal camera volume is an electronics housing 22 extending upwardly from a central portion of platform 24.

Figure 1:
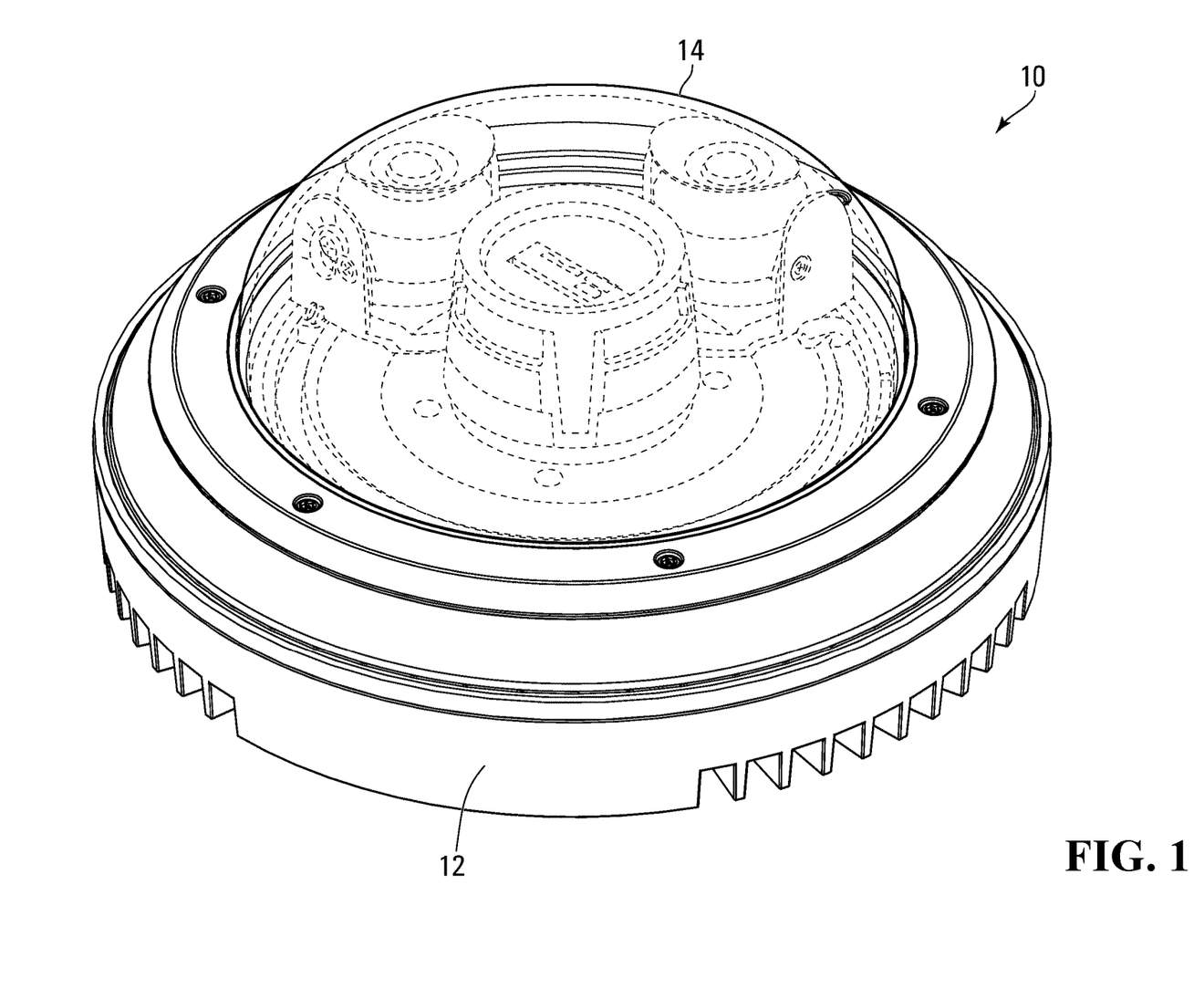
FIG. 1 is a perspective view of a multi-headed camera, in accordance with an embodiment of the disclosure.
Figure 2:
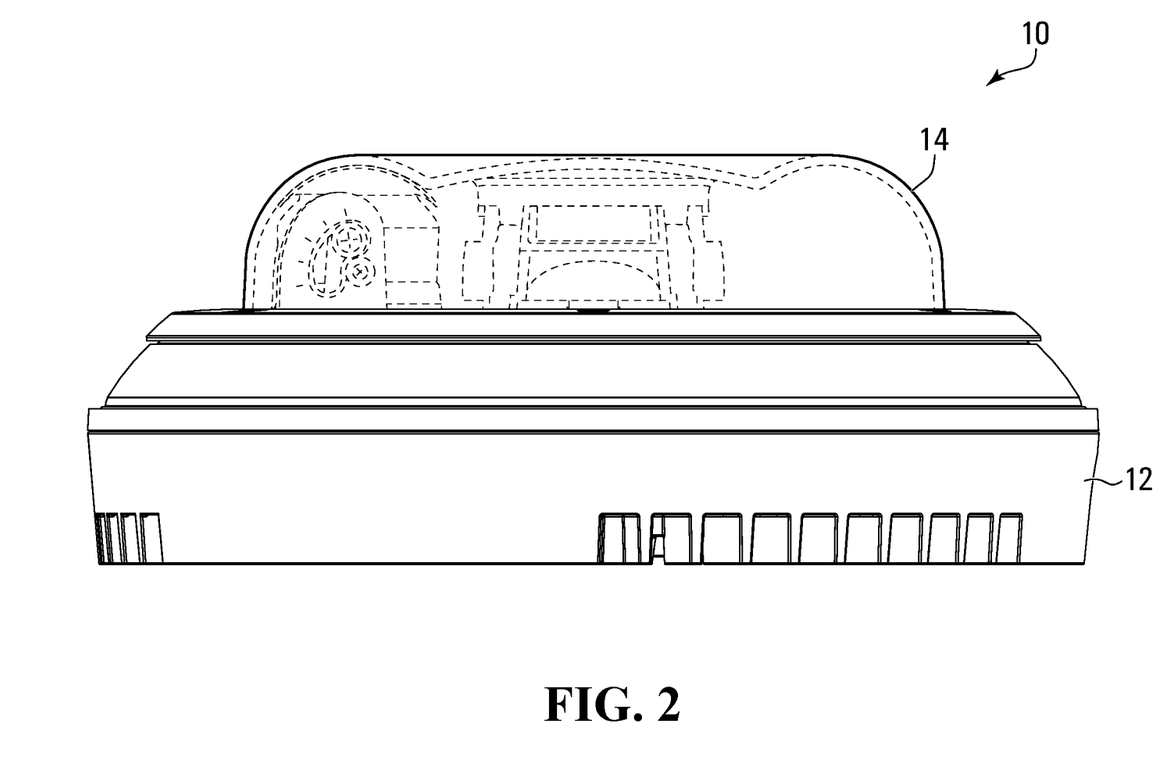
FIG. 2 is a side-on view of the multi-headed camera of FIG. 1.
Figure 3:
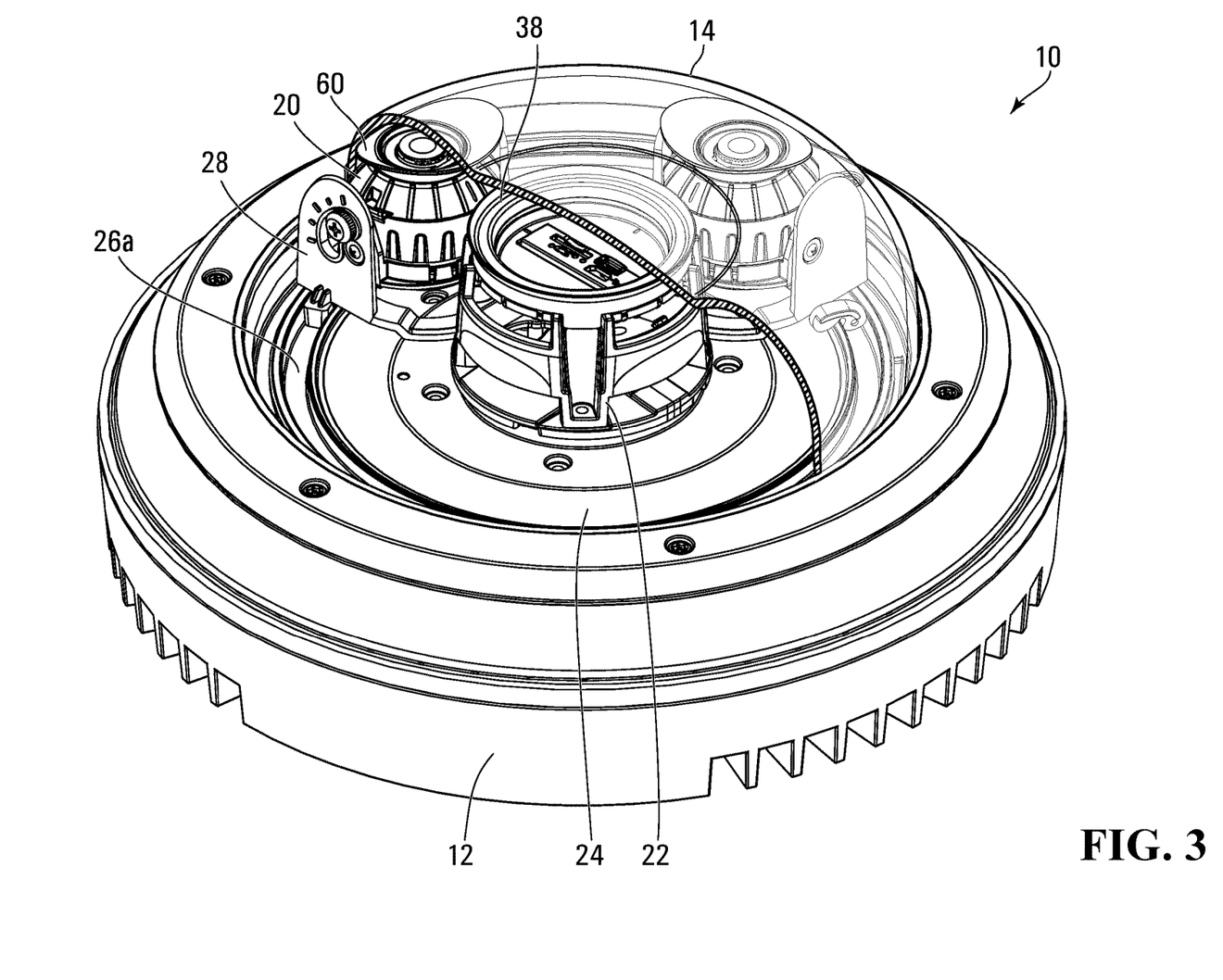
FIG. 3 is cut-away view of the multi-headed camera of FIG. 1, showing the interior of the camera.
Figure 5:
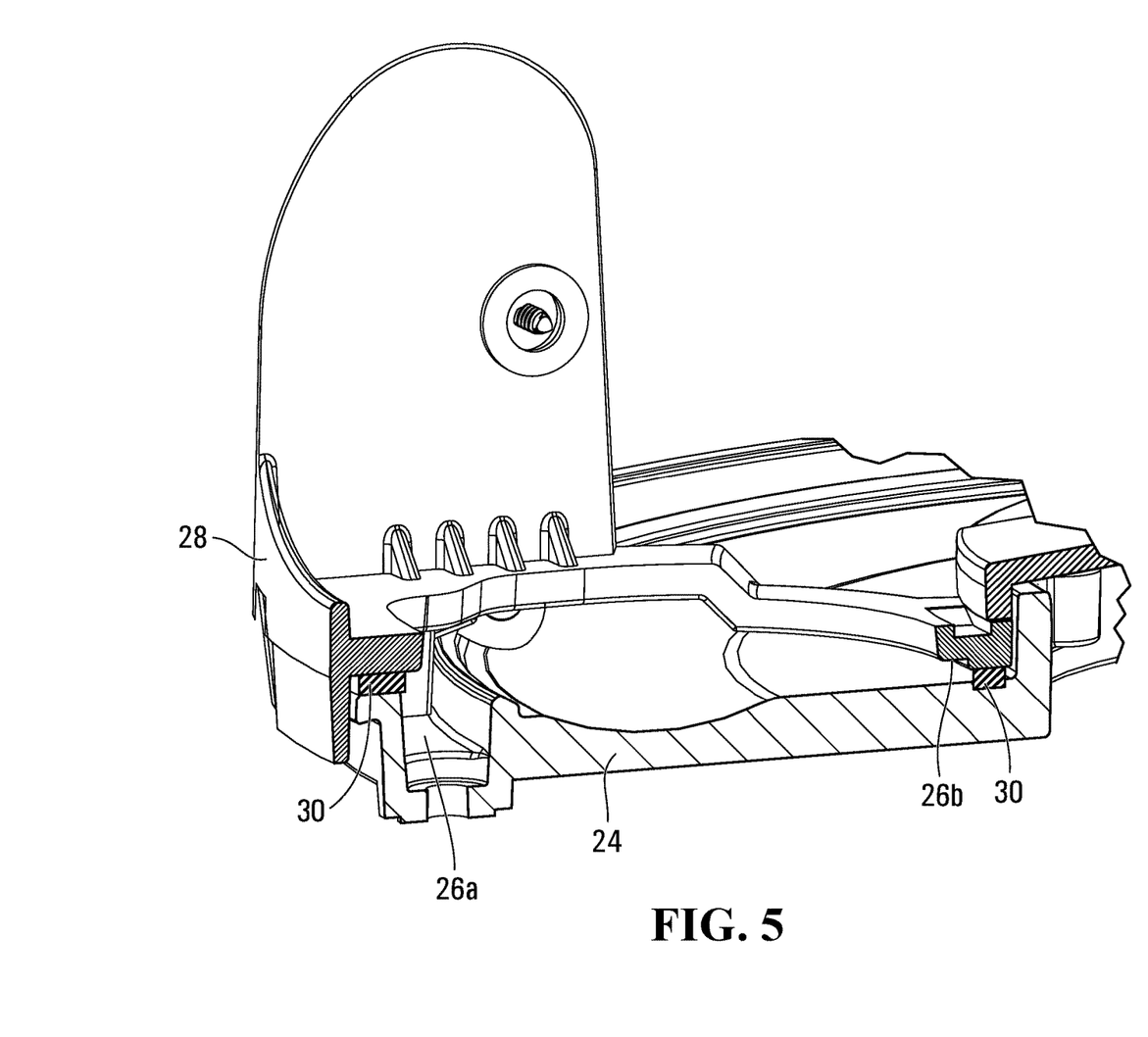
FIG. 5 is a magnified view of a camera head mount.

Camera heads 20 are configured to move along a pair of circular external and internal tracks 26a, b provided within platform 24 and extending around electronics housing 22, as can be seen in FIG. 3. In particular, each camera head 20 is coupled to a camera head mount 28 movably engaged to platform 24 by means of tracks 26a, b. As can be seen in FIG. 5 (with camera head 20 removed for clarity), camera head mount 28 is configured to slide along tracks 26a, b. In particular, an intermediary material 30 is provided between camera head mount 28 and platform 24. Intermediary material 30 is configured to provide a sufficient degree of friction between camera head mount 28 and platform 24 such that camera head mount 28 may not be easily displaced during installation, while still allowing manual adjustment of the position of camera head mount 28 along tracks 26a, b.

Figure 6A:
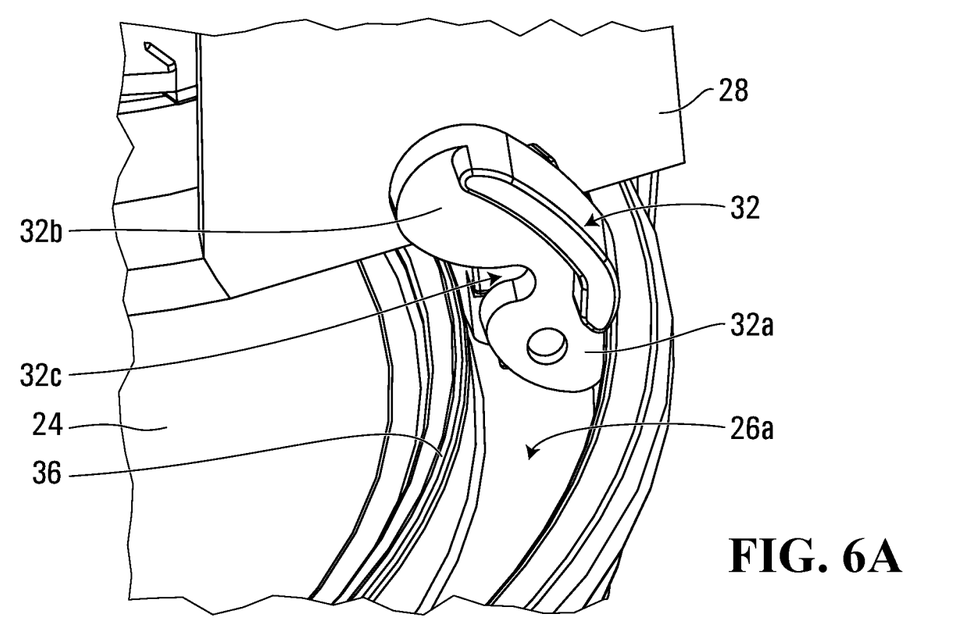
FIGS. 6A and 6B show respectively unlocked and locked positions of a mount lock.
Figure 6B:
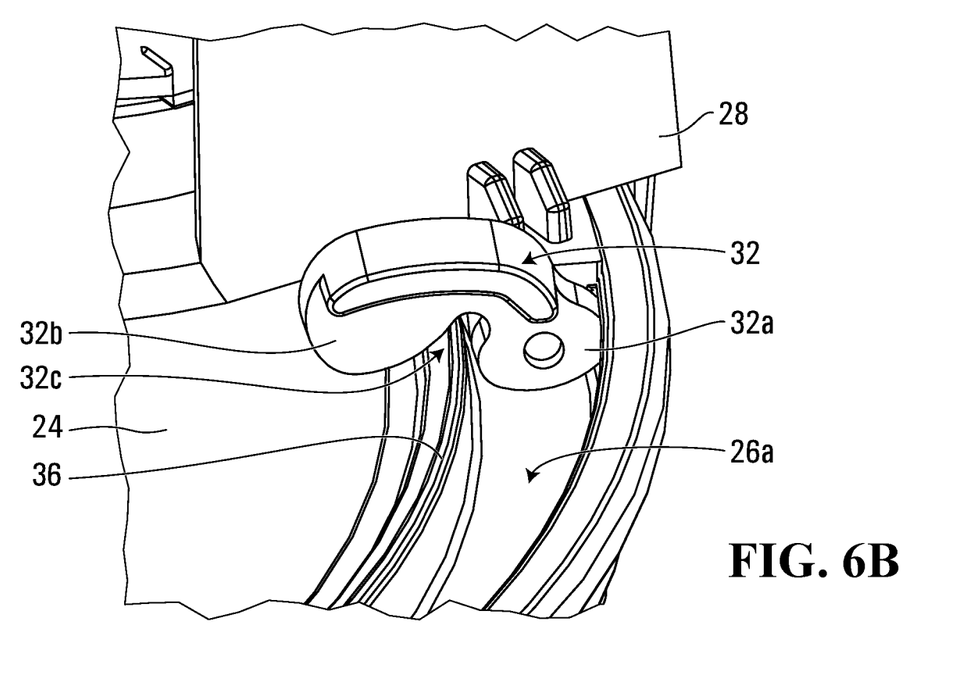

In order to secure the positions of camera heads 20 relative to platform 24, camera 10 further includes a number of mount locks 32 (seen in FIGS. 6A and 6B). In the present embodiment, each camera head 20 is associated with a corresponding mount lock 32, although it shall be understood that any number of mount locks 32 (including none) may be included for each camera head 20. Each mount lock 32 comprises a first lock portion 32a pivotally engaged to external track 26a, and a second lock portion 32b integrally formed with first lock portion 32a. Mount lock 32 may be positioned in an unlocked position (FIG. 6A) whereby first lock portion 32a is frictionally retained within external track 26a. In the unlocked position, first lock portion 32a is manually slideable within external track 26a such that mount lock 32 may move in either direction along external track 26a. In order to move mount lock 32 from the unlocked to a locked position (FIG. 6B), mount lock 32 is pivoted about first lock portion 32a until second lock portion 32b engages with platform 24. In particular, in the locked position a groove 32c located between first lock portion 32a and second lock portion 32b frictionally engages with an upstanding rib 36 on one side of external track 26a. The engagement of rib 36 within groove 32c increases the friction between platform 24 and mount lock 32, thereby preventing sliding of mount lock 32 within track 26a. With mount lock 32 in the locked position, camera head mount 28 and its corresponding camera head 20 are unable to be slid past mount lock 32. With a single mount lock 32 provided adjacent to camera head mount 28, camera head mount 28 is prevented from sliding in one direction along tracks 26a, b. An additional mount lock 32 provided adjacent to and on the other side of camera head mount 28 would prevent camera head mount 28 from moving in either direction, effectively locking camera head mount 28 in place.

As mentioned above, electronics housing 22 extends upwardly from a central portion of platform 24, and engages with shield 14. Electronics housing 22 houses within it various electronic components (not shown) such as vertically positioned PCBs. The electronic components are communicatively coupled to camera heads 20 and configured to process and transmit image data received from each of camera heads 20 to one or more remote computers for processing. In some embodiments, processing of the image data may be undertaken entirely by the electronics housed within electronics housing 22, or entirely by the one or more remote computers. In some embodiments, image data received from camera heads 20 may first be compressed using any suitable compression technique known in the art, such as High Efficiency Video Coding (H.265), before the image data is transmitted from camera 10.

Figure 4:
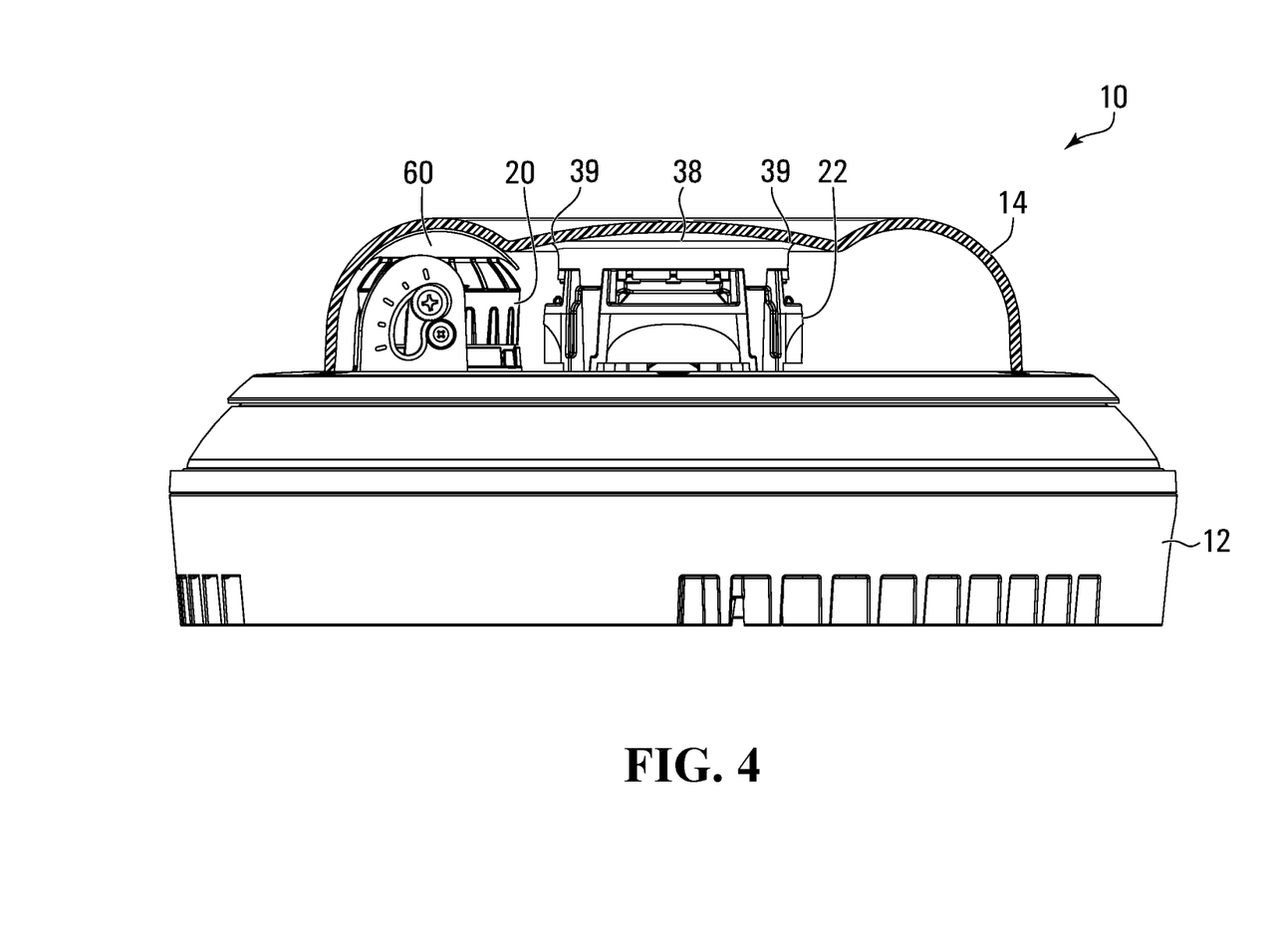
FIG. 4 is a side-on view of the multi-headed camera of FIG. 3.
Figure 7A:
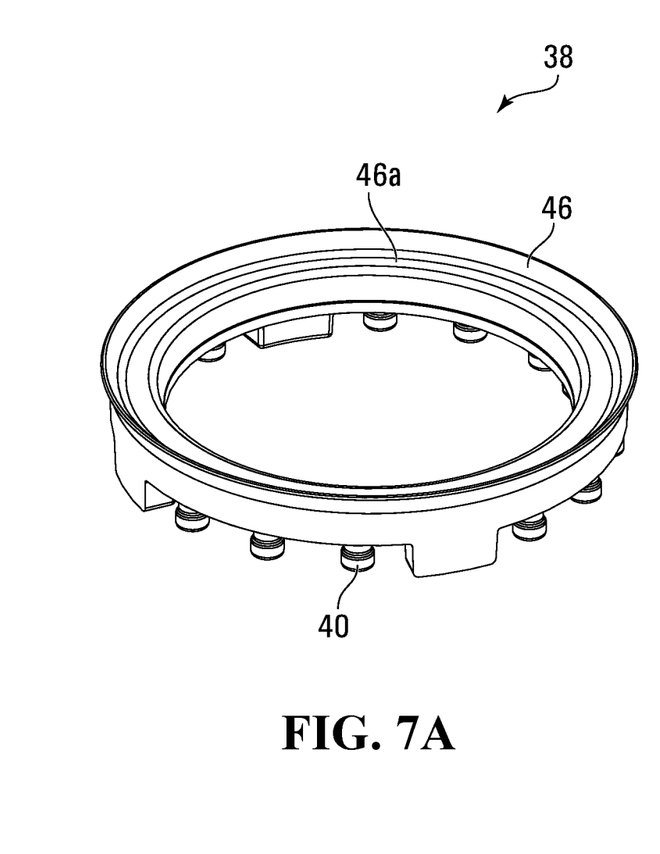
FIGS. 7A and 7B show respectively first and second sides of an electronics housing shock absorber.
Figure 7B:
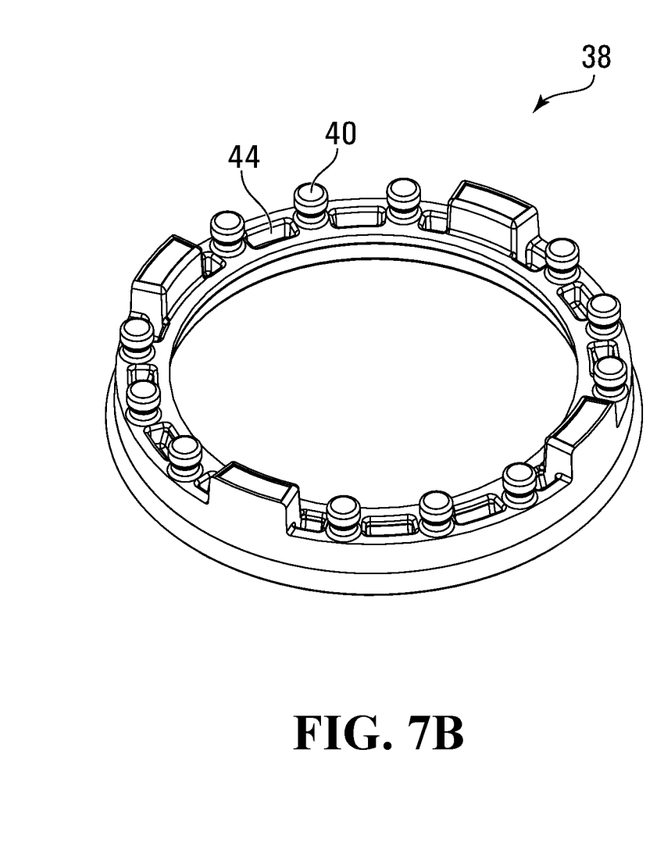

At one end of electronics housing 22 is provided a resiliently deformable, ring-shaped shock absorber 38. Shock absorber 38 comprises silicone, although in other embodiments shock absorber 38 may be formed of other resiliently deformable materials, such as other types of elastomers. Shock absorber 38 is shown in more detail in FIGS. 7A and 7B. On one side (FIG. 7B) of shock absorber 38, multiple retaining tabs 40 are provided for engaging with corresponding apertures in housing 22. Located between adjacent retaining tabs 40 are pockets 44. Pockets 44 are configured to increase the flexibility of shock absorber 38, by allowing greater deformation of shock absorber 38 in response to impacts. Turning to FIG. 7A, on a second side of shock absorber 38 is provided a flexible sealing rib 46. Rib 46 flares outwardly from a rib base 46a and is configured to seal against shield 14 as can be seen in FIG. 4.

Figure 8:
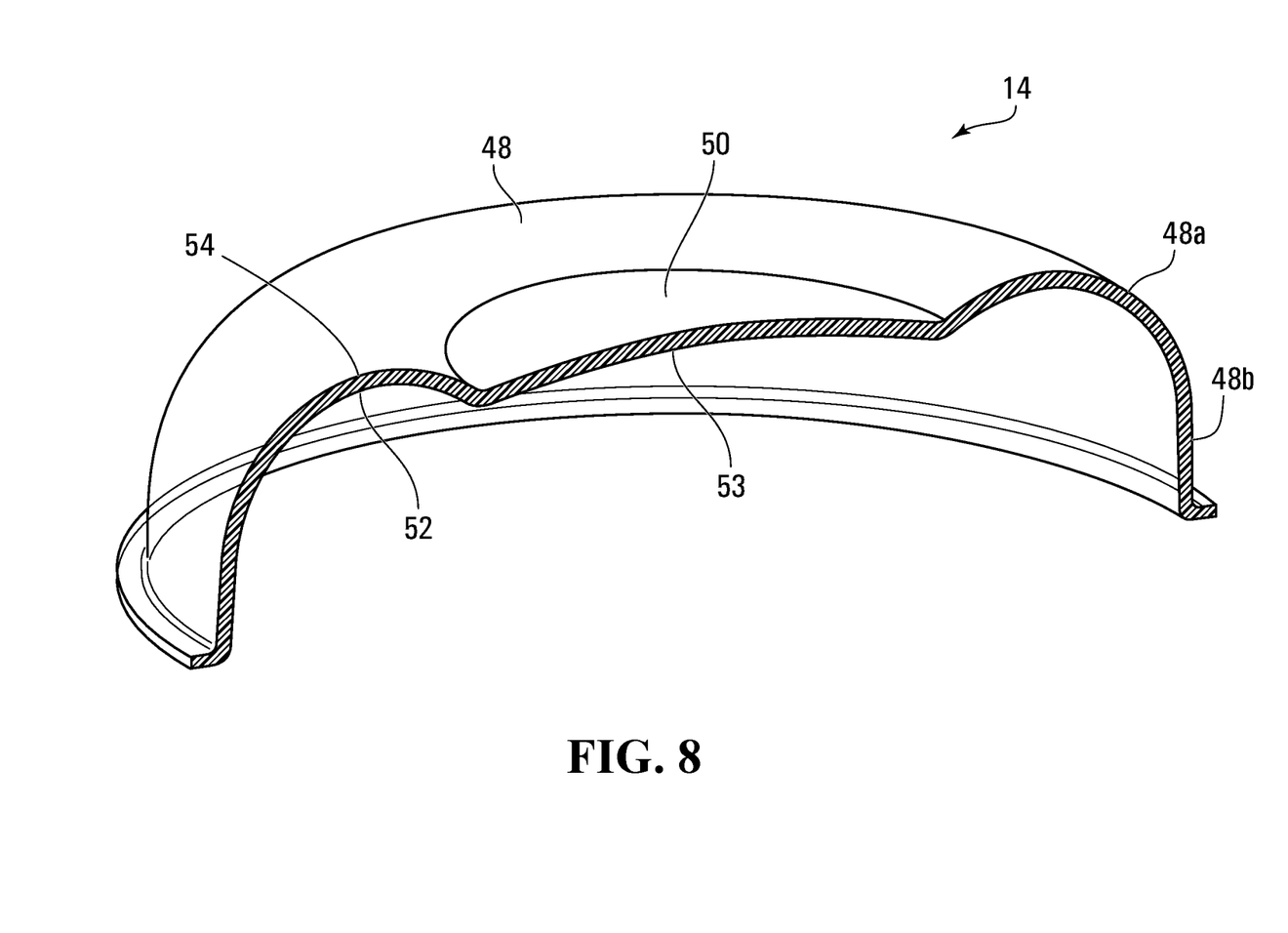
FIG. 8 is a cross-sectional view of the protective shield of the multi-headed camera of FIG. 1.

Now turning to FIG. 8, there is shown a cross-section of shield 14 in more detail. Shield 14 is substantially toroidal-shaped, with a first, domed inner portion 50 ringed by a second, domed outer portion 48 defining a periphery of shield 14. Outer portion 48 is shaped so as to sealingly engage with gaskets provided on camera heads 20 (described in further detail below), whereas inner portion 50 is shaped so as to sealingly engage with shock absorber 38 of electronics housing 22. Outer portion 48 includes a hemispherical portion 48a and at least one non-hemispherical portion 48b. In some embodiments, shield 14 is made of rigid polycarbonate, although other suitable materials may be used. While shield 14 is transparent to visible light, in some embodiments shield 14 may be only partially transparent to visible light (for example shield 14 may be "smoked" or darkened) so as to prevent or inhibit an outside observer from looking into camera 10. In some embodiments, shield may have a transparency of about 88%, whereas in a "smoked" or darkened state shield may have a transparency of about 50%. Shield 14 comprises a thickness defined by an inner surface 52 and an outer surface 54. Inner surface 52 of inner portion 50 is crowned at crowned portion 53, so as to reduce total internal reflection of light within the thickness of shield 14. Crowning may refer to a roughening and/or a texturing of the surface of shield 14. As can be seen in FIG. 4, shock absorber 38 defines a ringed seal 39 with inner portion 50 of shield 14. Crowned portion 53 of shield 14 extends beyond ringed seal 39 defined by shock absorber 38. Therefore, light that is not blocked from entering camera 10 by ringed seal 39 may still be prevented from entering camera 10 by crowned portion 53.

Figure 9:
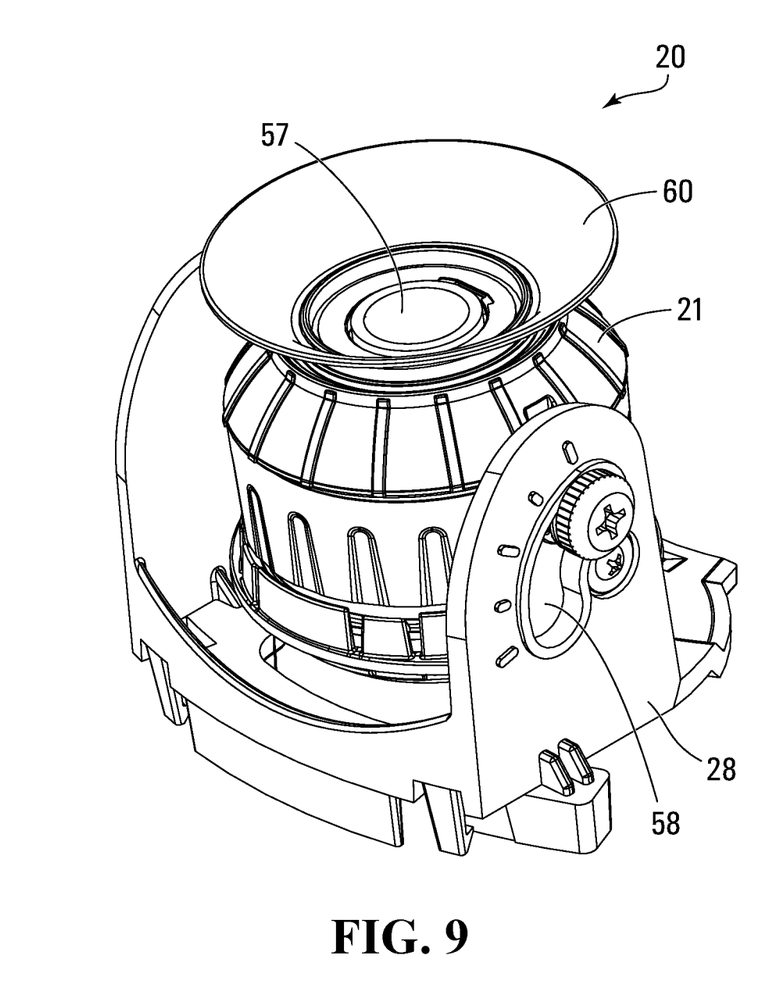
FIG. 9 is a perspective view of a camera head and a gasket, attached to a camera lens cover, in accordance with an embodiment of the disclosure.

Now turning to FIG. 9, there is shown a camera head 20 in more detail. As described above, camera head 20 comprises a camera lens cover 21 pivotally coupled to camera head mount 28, and a resiliently deformable gasket 60 attached to camera lens cover 21. Camera head 20 is configured to pivot relative to camera head mount 28 by means of a track 58. Camera head 20 is pivotable from one end of track 58 to an opposite end of track 58, these positions of camera head 20 thereby defining a minimum observation angle and a maximum observation angle of camera lens 57. A current observation angle of camera lens 57 is defined by the direction in which camera lens 57 is oriented. In some embodiments, camera head 20 may pivot through an arc of about 103 degrees, although the disclosure extends to any suitable extent of pivoting.

Figure 10:
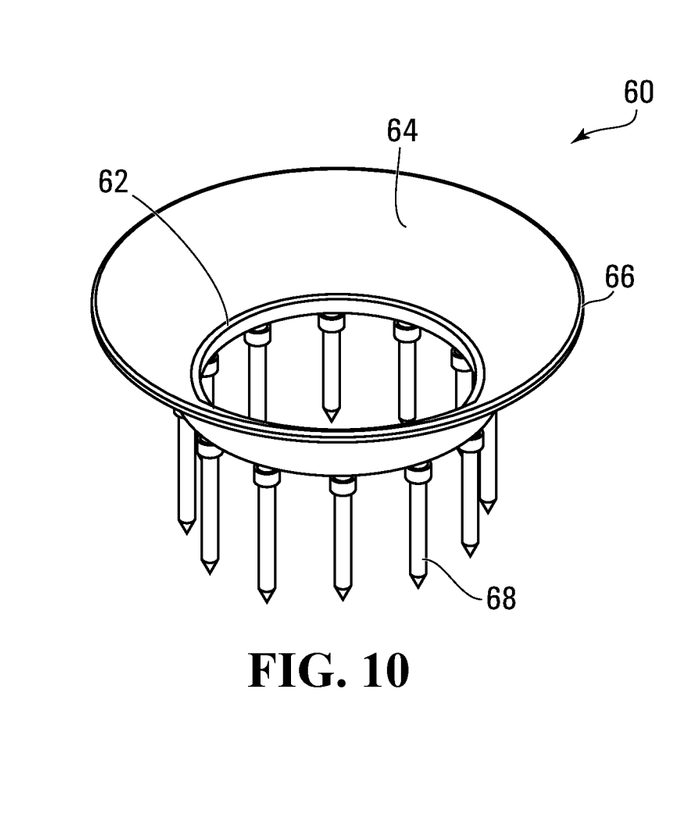
FIG. 10 is a perspective view of another embodiment of a gasket.

Resiliently deformable gasket 60 (an embodiment of which is shown in more detail in FIG. 10) is attached to camera lens cover 21 and positioned around camera lens 57. Gasket 60 extends away from camera lens cover 21 towards shield 14, and generally comprises a shape of a truncated cone, with the sides of the cone being curved and concave. In some embodiments, gasket 60 is made of a suitable elastomer, such as silicone, although other suitable materials may be used, provided that gasket 60 may perform its desired function as described below. Gasket 60 comprises a circular gasket base 62 integrally formed with a flared sealing portion 64 extending outwardly from gasket base 62. The flaring of sealing portion 64 may comprise sealing portion 64 extending in a monotonic fashion outwardly and away from a central observation axis defined by camera lens 57. Gasket base 62 is configured to be attached to camera lens cover 21. Various means may be used to affix gasket base 62 to camera lens cover 21. For example, in some embodiments an adhesive or other bonding agent may be applied to gasket base 62 for attaching gasket 60 to camera lens cover 21. In other embodiments, a number of elongate fasteners 64 may extend from gasket base 62 and may engage with corresponding apertures in camera lens cover 21. It is generally desirable that gasket 60 be attached to camera lens cover 21 with sufficient bonding strength. For example, a sufficiently strong bonding agent should be used, or a sufficient number of fasteners (in one embodiment twelve fasteners) should be used, for preventing gasket 60 from inverting or turning inside out when gasket 60 contacts shield 14. If gasket 60 is attached to camera lens cover 21 with insufficient bonding strength, there is a risk that gasket 60 will irreversibly invert given the flexibility and resilient deformability of gasket 60.

Figure 11:
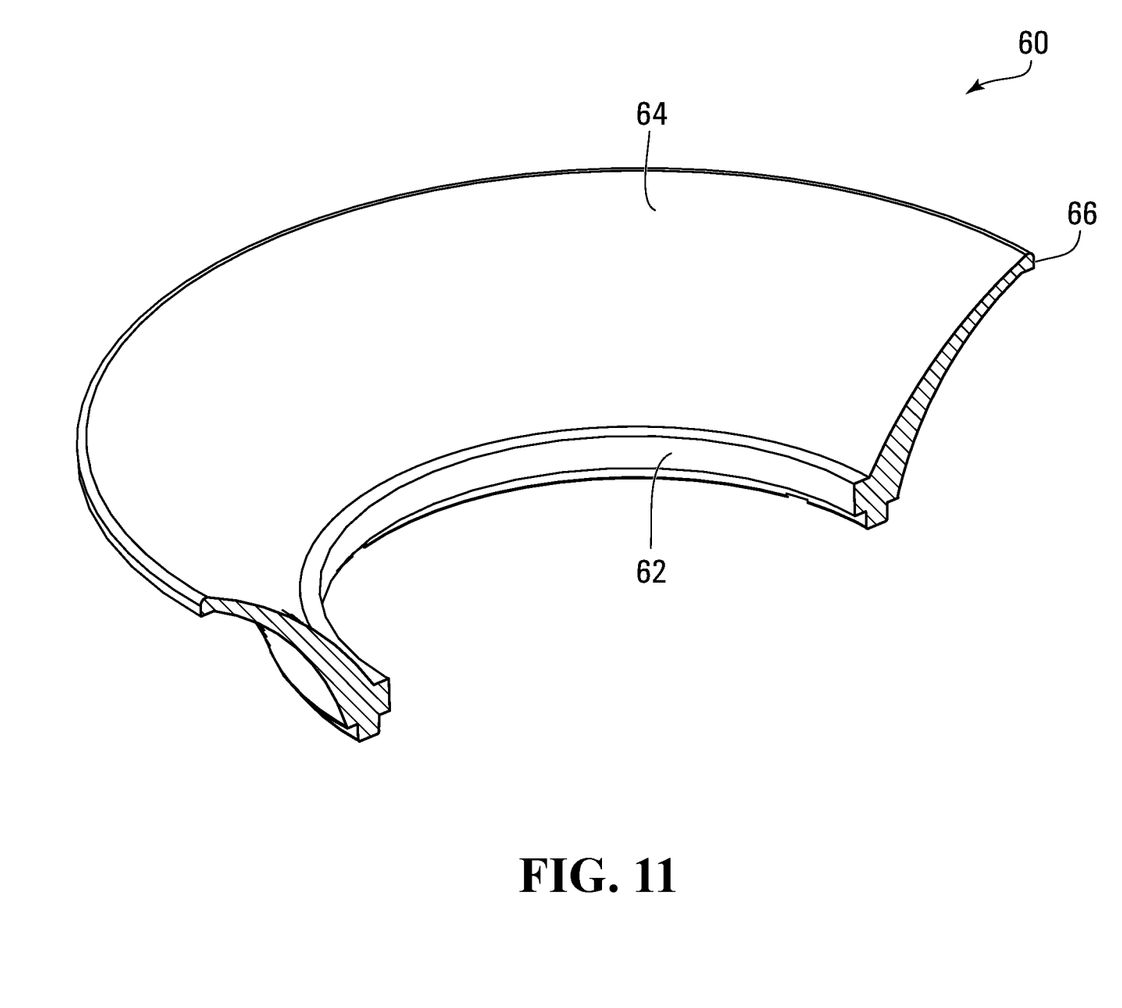
FIG. 11 is a cross-sectional view of a portion of the gasket of FIG. 9.

As can be seen in FIG. 11, flared sealing portion 64 terminates in a ringed lip portion 66 configured to contact and engage with inner surface 52 of shield 14. Gasket 60, and in particular ringed lip portion 66, is treated with a substance in order to reduce the surface roughness of the silicone, and thereby reduce the coefficient of friction between sealing portion 64 and shield 14. In some embodiments, the substance comprises a two-component coating such as the SL-030-5 series manufactured by Betterly LLC.

As can also be seen in FIG. 11, a thickness of gasket 60 decreases in a direction from gasket base 62 to ringed lip portion 66. In some embodiments, a ratio of the thickness of gasket 60 at gasket base 62 to the thickness of gasket 60 at ringed lip portion 66 is about 3:1, or more particularly may be about 3.26:1.

Figure 12A:
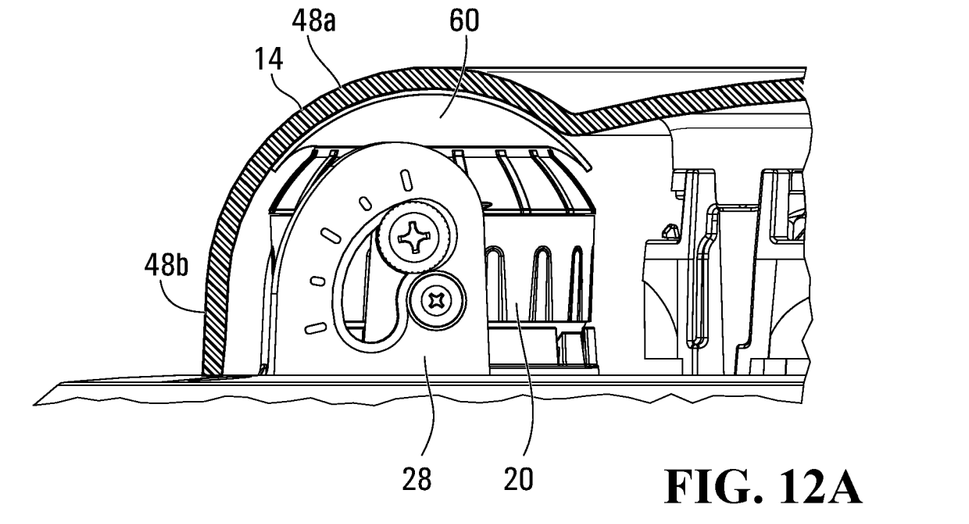
FIGS. 12A and 12B are magnified side-on views of a camera head of the multi-headed camera of FIG. 4, with the camera lens at respective maximum and minimum observation angles.
Figure 12B:
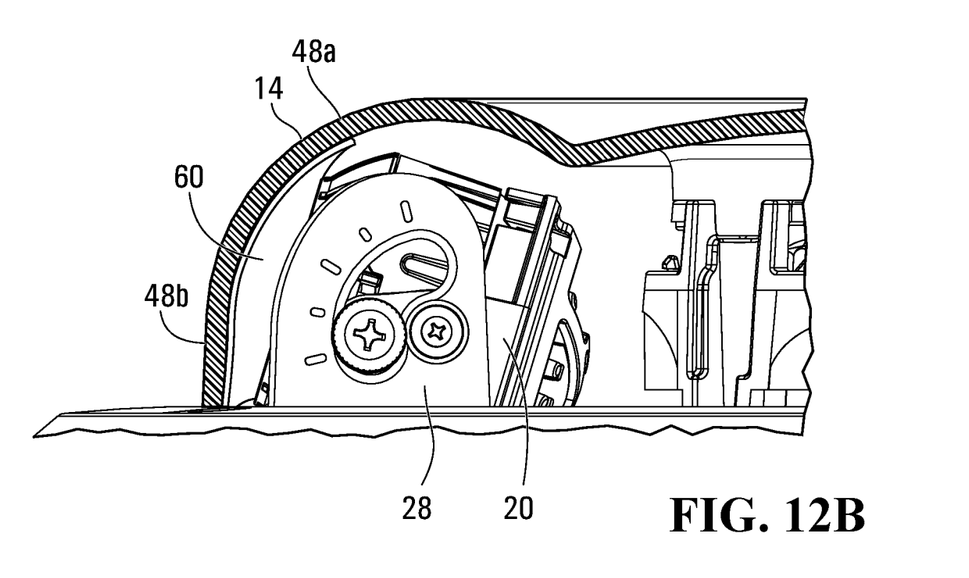
Figure 13A:
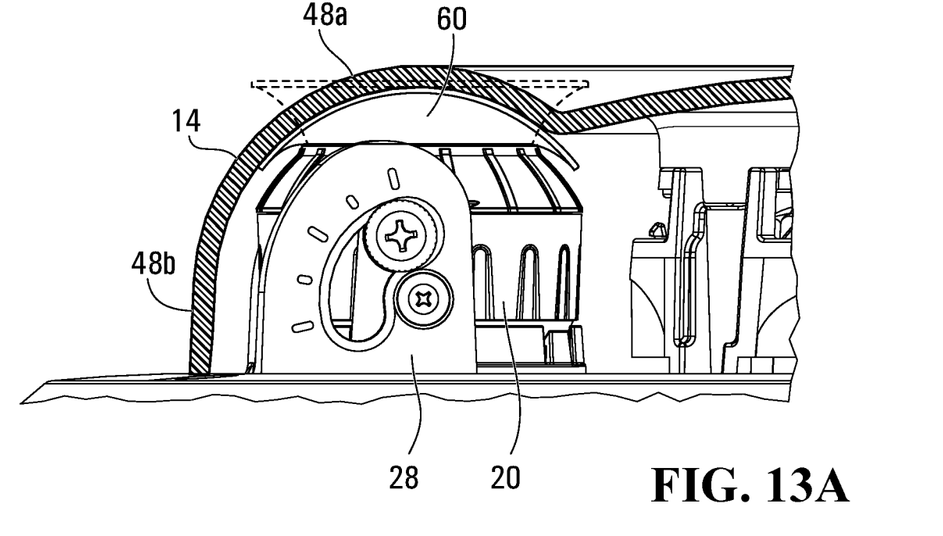
FIGS. 13A and 13B show the camera head of FIGS. 12A and 12B with the gasket in its uncompressed state overlaid thereon.
Figure 13B:
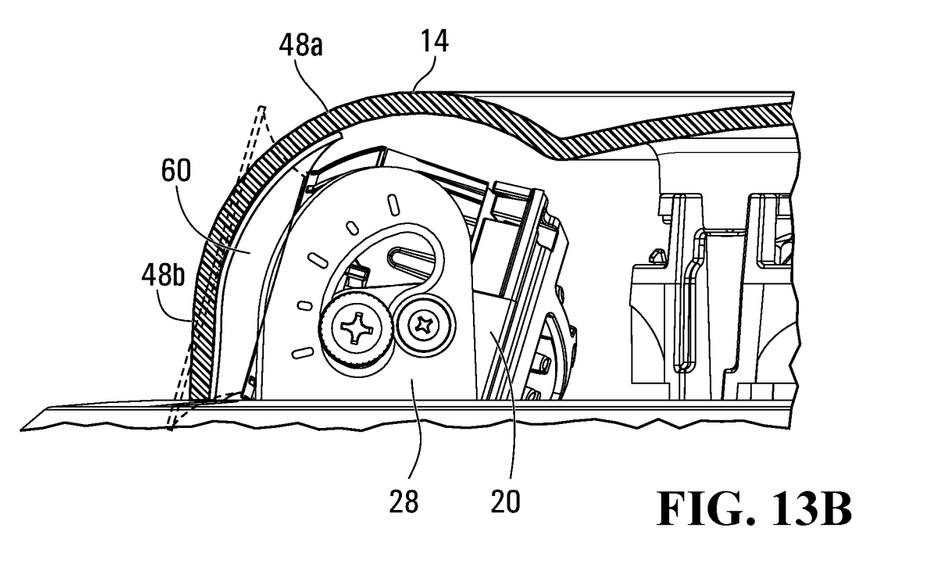

FIGS. 12A and 12B show camera head 20 pivoted to a maximum observation angle (FIG. 12A) and a minimum observation angle (FIG. 12B). As can be seen from FIGS. 12A and 12B, the distance between camera head 20 and inner surface 52 of outer portion 48 varies as a function of the current observation angle of camera lens 57, due to the non-spherical curvature of outer portion 48b of shield 14. Thus, gasket 60 in FIG. 12A is in a more compressed state than gasket 60 in FIG. 12B. The relative shapes of gasket 60 in its uncompressed and compressed states may be visualized in FIGS. 13A and 13B, in which gasket 60 in its uncompressed state is shown overlaid in each Figure. In some embodiments, the ratio of the radius of curvature of gasket 60 in its compressed state in FIG. 12A (corresponding to the maximum observation angle) to its compressed state in FIG. 12B (corresponding to the minimum observation angle) may be about 3:1, or more particularly about 3.22:1.

While the distance between camera head 20 and inner surface 52 of outer portion 48 varies as a function of the current observation angle of camera lens 57, for substantially all optical paths from camera lens 57 to shield 14, the distance between shield 14 and camera lens 57 is constant due to the constant curvature of hemispherical portion 48a of shield 14. As camera head 20 is pivoted between the minimum and maximum observation angles, gasket 60 maintains a substantial light seal with shield 14. In particular, for any given observation angle between the minimum and maximum observation angles, gasket 60 contacts shield 14 about a closed light seal path defined by the contact between ringed lip portion 66 and shield 14. The light seal substantially prevents light, such as visible light and infrared light, from passing between shield 14 and gasket 60, and interfering with camera lens 57.

When camera head 20 is pivoted such that the distance between camera head 20 and inner surface 52 of shield 14 decreases, in order to accommodate the reduction in distance, the particular material, thickness and coefficient of friction of flared sealing portion 64 may assist in causing ringed lip portion 66 to extend along inner surface 52 of shield 14 as gasket 60 is compressed against shield 14. The reduced coefficient of friction of ringed lip portion 66 and the tapered thickness of gasket 60 may assist in preventing flared sealing portion 64 from sticking to shield 14 and from folding over itself. Folding over may refer to ringed lip portion 66 no longer moving in a conformational manner relative to inner surface 52 of shield 14, but rather extending away from shield 14. The direction of the friction force generated by the contact between shield 14 and gasket 60 is sufficiently low so as to reduce the tendency of gasket 60 from folding over. Thus, for all observation angles between the minimum and maximum observation angles, a substantial light seal may be maintained between gasket 60 and shield 14 with a relatively low risk of ringed lip portion 66 from folding over.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A gasket for a camera lens, comprising:
   a gasket base for positioning around a camera lens; and
   a resiliently deformable and flared sealing portion extending from the gasket base and for sealing against a protective shield for a camera lens, wherein a thickness of the gasket decreases in a direction from the gasket base to the sealing portion,
   wherein the sealing portion is treated with a substance for reducing a surface roughness of the sealing portion.

2. The gasket of claim 1, wherein a ratio of the thickness of the gasket at the gasket base to the thickness of the gasket at the sealing portion is about 3:1.

3. The gasket of claim 1, wherein the gasket comprises an elastomer.

4. The gasket of claim 1, wherein the gasket comprises a shape of a truncated cone with concave sides.

5. The gasket of claim 1, further comprising a bonding agent applied to the gasket base for attaching the gasket to a camera lens cover.

6. The gasket of claim 1, wherein the gasket base and the sealing portion are integrally formed.

7. The gasket of claim 1, wherein the substance comprises a two-component coating.

8. The gasket of claim 3, wherein the elastomer comprises silicone.

9. A camera head comprising:
   a camera lens;
   a camera lens cover rigidly coupled to the camera lens; and
   a gasket comprising:
      a gasket base attached to the camera lens cover and positioned around the camera lens; and
      a resiliently deformable and flared sealing portion extending from the gasket base and for sealing against a protective shield for a camera lens, wherein a thickness of the gasket decreases in a direction from the gasket base to the sealing portion,
      wherein the sealing portion is treated with a substance for reducing a surface roughness of the sealing portion.

10. The camera head of claim 9, wherein the substance comprises a two-component coating.

11. A multi-headed camera comprising:
    a camera base;
    multiple camera heads coupled to the camera base, each camera head comprising a camera lens defining an observation angle, and each camera head being configured to pivot such that the observation angle may vary between a minimum observation angle and a maximum observation angle;
    a protective shield attached to the camera base, extending over the camera heads, and shaped such that for each camera head a distance between the shield and the camera head varies as a function of the observation angle; and
    attached to each camera head:
       a resiliently deformable and flared gasket positioned around the camera lens and extending toward the shield, wherein the gasket is configured such that, for any observation angle between the minimum and maximum observation angles, the gasket contacts the shield about a closed light seal path for preventing light from passing between the shield and the gasket, and reaching the camera lens.

12. The camera of claim 11, wherein the distance between the shield and the camera head is determined according to a straight line extending from the shield to the camera head, wherein the straight line does not comprise an optical path extending from the shield to the camera lens.

13. The camera of claim 11, wherein the minimum and maximum observation angles comprise elevation angles of the camera lens relative to the camera base.

14. The camera of claim 11, wherein a thickness of at least one of the gaskets decreases in a direction from the camera head to the shield.

15. The camera of claim 11, wherein at least one of the gaskets comprises an elastomer.

16. The camera of claim 11, wherein a friction force between at least one of the gaskets and the shield is less than a force required for the at least one of the gaskets to fold over itself, for any observation angle between the minimum and maximum observation angles.

17. The camera of claim 11, wherein at least one of the gaskets is treated with a substance for reducing a coefficient of friction between the at least one of the gaskets and the shield.

18. The camera of claim 11, wherein at least one of the gaskets comprises a shape of a truncated cone with concave sides.

19. The camera of claim 11, wherein the shield is partially transparent to visible light so as to prevent an observer from viewing the camera heads.

20. The camera of claim 11, further comprising:
 an electronics housing extending from the camera base; and
 a shock absorber attached to the electronics housing and engaged with the shield.

21. The camera of claim 11, wherein at least one of the gaskets is configured such that the at least one of the gaskets is prevented from folding over itself as the camera head is moved such that the distance between the shield and the camera head is decreased.

22. The camera of claim 15, wherein the elastomer comprises silicone.

23. The camera of claim 20, wherein the shock absorber comprises a resiliently deformable member configured to seal against the shield.

24. The camera of claim 20, wherein a portion of the shield engaged with the shock absorber extends away from the camera base.

25. The camera of claim 23, wherein the resiliently deformable member is ring-shaped.

26. The camera of claim 23, wherein the resiliently deformable member comprises a flared sealing rib configured to seal against the shield.

* * * * *